(12) United States Patent
Matsuo (10) Patent No.: US 7,090,068 B2
(45) Date of Patent: Aug. 15, 2006

(54) PALETTE CONVEYANCE MECHANISM AND ASSEMBLING LINE USING IT

(75) Inventor: Kenichi Matsuo, Mie (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/111,934

(22) PCT Filed: Sep. 12, 2001

(86) PCT No.: PCT/JP01/07902

§ 371 (c)(1),
(2), (4) Date: May 1, 2002

(87) PCT Pub. No.: WO02/22473

PCT Pub. Date: Mar. 21, 2002

(65) Prior Publication Data

US 2002/0162727 A1 Nov. 7, 2002

(30) Foreign Application Priority Data

Sep. 14, 2000 (JP) .............................. 2000-279556

(51) Int. Cl.
*B65G 29/00* (2006.01)

(52) U.S. Cl. .................................... 198/465.1; 198/580
(58) Field of Classification Search ............. 198/465.1, 198/465.2, 465.3, 580, 589
See application file for complete search history.

(56) References Cited

U.S. PATENT DOCUMENTS

| 4,479,572 A | * | 10/1984 | Merz | 198/465.3 |
| 4,515,264 A | * | 5/1985 | Sticht | 198/465.2 |
| 4,762,218 A | * | 8/1988 | Sticht | 198/465.2 |
| 5,012,917 A | * | 5/1991 | Gilbert et al. | 198/465.2 |
| 5,213,195 A | * | 5/1993 | Sticht | 198/465.2 |
| 5,271,490 A | * | 12/1993 | Sticht | 198/465.2 |
| 6,227,351 B1 | * | 5/2001 | Leisner | 198/571 |

FOREIGN PATENT DOCUMENTS

| JP | 49-112377 | 10/1974 |
| JP | 51-135085 | 11/1976 |
| JP | H4-153115 | 5/1992 |
| JP | 6-271055 | 9/1994 |
| JP | H6-271055 | 9/1994 |
| JP | H8-244930 | 9/1996 |
| JP | 8-282834 | 10/1996 |
| JP | H8-282834 | 10/1996 |

OTHER PUBLICATIONS

JP Office Action mailed Jan. 18, 2006 for JP 2000-279556.

* cited by examiner

*Primary Examiner*—James R. Bidwell
(74) *Attorney, Agent, or Firm*—Sughrue Mion, PLLC (57) ABSTRACT

It is the pallet conveying mechanism to move a pallet P arrived at an end point 17b of a friction conveyer FC2 to a starting point 7a of a friction conveyer FC1 in just as it is the direction without turning. The pallet conveying mechanism is comprised of rollers 34 having a flange portion 34a to contact with the pallet P by arranging along a main frame 31 provided so as to connect the friction conveyer FC 1 and FC 2 with each other and a drive mechanism 35 for driving rollers 34.

11 Claims, 7 Drawing Sheets

PALETTE CONVEYANCE MECHANISM AND ASSEMBLING LINE USING IT

FIELD OF THE INVENTION

The present invention relates to a conveying mechanism of a pallet having a vehicle body and an assembling line using such a conveying mechanism.

BACKGROUND ART

A vehicle assembling line assembles a vehicle by attaching several kinds of parts to a vehicle body while the vehicle body is transferred by a hanger or by a pallet carried along a conveying line. Hereupon, a wiring for an electric system, interior parts such as an instrumental panel or seat, parts for underbody such as engine or tire, and exterior parts such as mirror or wiper are attached to the vehicle body.

Of these, wiring for electric system and interior parts such as the instrument panel are manually attached by workers to the vehicle body loaded onto the pallet circulating through a line-arrangement or a flat loop-arrangement conveying line. Especially, the assembling line installed as a flat loop-arrangement can be widely used because the constitution of the conveying line can be simplified and utilization efficiency of a factory site can be improved.

As a conventional example of the assembling line installed as a flat loop-arrangement and the pallet conveying mechanism used for this assembling line, some of these are disclosed in Japanese Unexamined Patent Publication Sho. 58-22633 or Japanese Examined Patent Publication Sho. 61-33743.

The assembling line according to Japanese Unexamined Patent publication Sho. 58-22633 is comprised of a pair of conveying lines and a pair of traverse lines connected to each other. Rails established along each line and a moving mechanism to move the pallet along the rails are used for the pallet conveying mechanism.

Furthermore, the assembling line according to Japanese Examined Patent publication Sho. 61-33743 has a pair of conveying lines and a traverse line connected to each other. Additionally, the pallet conveying mechanism used in this assembling line is comprised of a rack gear provided along the traverse line and a traversor equipped with the pallet to move from one edge to the other edge of a traverse line. Moreover, the traversor includes a drive mechanism and a tuning table engaging with a rack gear to turn the pallet.

According to this pallet conveying mechanism, the pallet is loaded onto the traverser to be transferred from one end portion to the other end portion of the traverse line, at the same time as it is turned 180° around by the turning table.

However, this assembling line has a problem such that the pallet conveying mechanism is complicated in structure. More specifically, the pallet conveying mechanism according to Japanese Unexamined Patent Publication Sho. 58-22633 has a mechanism to slide the pallet along rails. Therefore, the pallet is required to have the mechanism capable of moving in not only lengthwise direction but also breadthwise direction and means for switching the moving direction. Consequently, the pallet conveying mechanism is complicated in structure.

On the other hand, the pallet conveying mechanism according to Japanese Examined Patent Publication No. 61-33743 has a mechanism to turn the pallet while conveying the pallet. Therefore, the mechanism for conveying the pallet is complicated. Meanwhile, since the following pallet cannot be conveyed until the traversor is returned to the original position after conveying the pallet, it takes much time to convey the pallet on the traverse line.

DISCLOSURE OF THE INVENTION

Accordingly, an object of the present invention is to provide a pallet conveying mechanism capable of rapidly circulating the pallet through a simple mechanism, and the assembling line using this pallet conveying mechanism.

The present invention relates to a pallet conveying mechanism, which connects a first conveying line and a second conveying line opposing to said first conveying line and carries the pallet from the end point of the first conveying line to the starting point of the second conveying line comprising a plurality of rollers arranged so as to move the pallet perpendicularly to the conveying directions of the first conveying line and the second conveying line, a driving means for rotating rollers, and a guide means for preventing the pallet from veering while the pallet is being conveyed. The pallet conveying mechanism constituted in this way can convey the pallet from the second conveying line to the first conveying line without turning. Additionally, providing the guide means can prevent the pallet from veering when said pallet is being conveyed from the first conveying line to the second conveying line, consequently, the pallet can be conveyed more rapidly.

Moreover, the invention further relates to an assembling line comprising a first conveying line, a second conveying line, a pallet conveying mechanism as set forth above connecting the end point of the first conveying line and the starting point of the second conveying line, and a traverse line connecting the end point of the second conveying line and the starting point of the first conveying line, wherein, parts are attached to a vehicle body loaded onto the pallet while the pallet is circulated through the assembling line.

The assembling line constituted in this way can transfer the pallet rapidly without turning from the end point of the first conveying line to the starting point of the second conveying line due to a sliding mechanism. Consequently, this simple mechanism can efficiently circulate the pallet to assemble the vehicle body.

Furthermore, the invention relates to the assembling line as set forth above wherein the traverse line has a turning table at both ends of the traverse line to turn the pallet 90° around.

According to the assembling line constituted in this way, turning the pallet 180° around on the traverse line can prevent the vehicle body loaded onto the pallet from veering in the direction of the first and second conveying line. Consequently, the working efficiency of workers can be improved.

BEST MODE FOR CARRYING OUT THE INVENTION

The embodiment of the present invention is described in detail with reference to the drawings.

Figure 1:
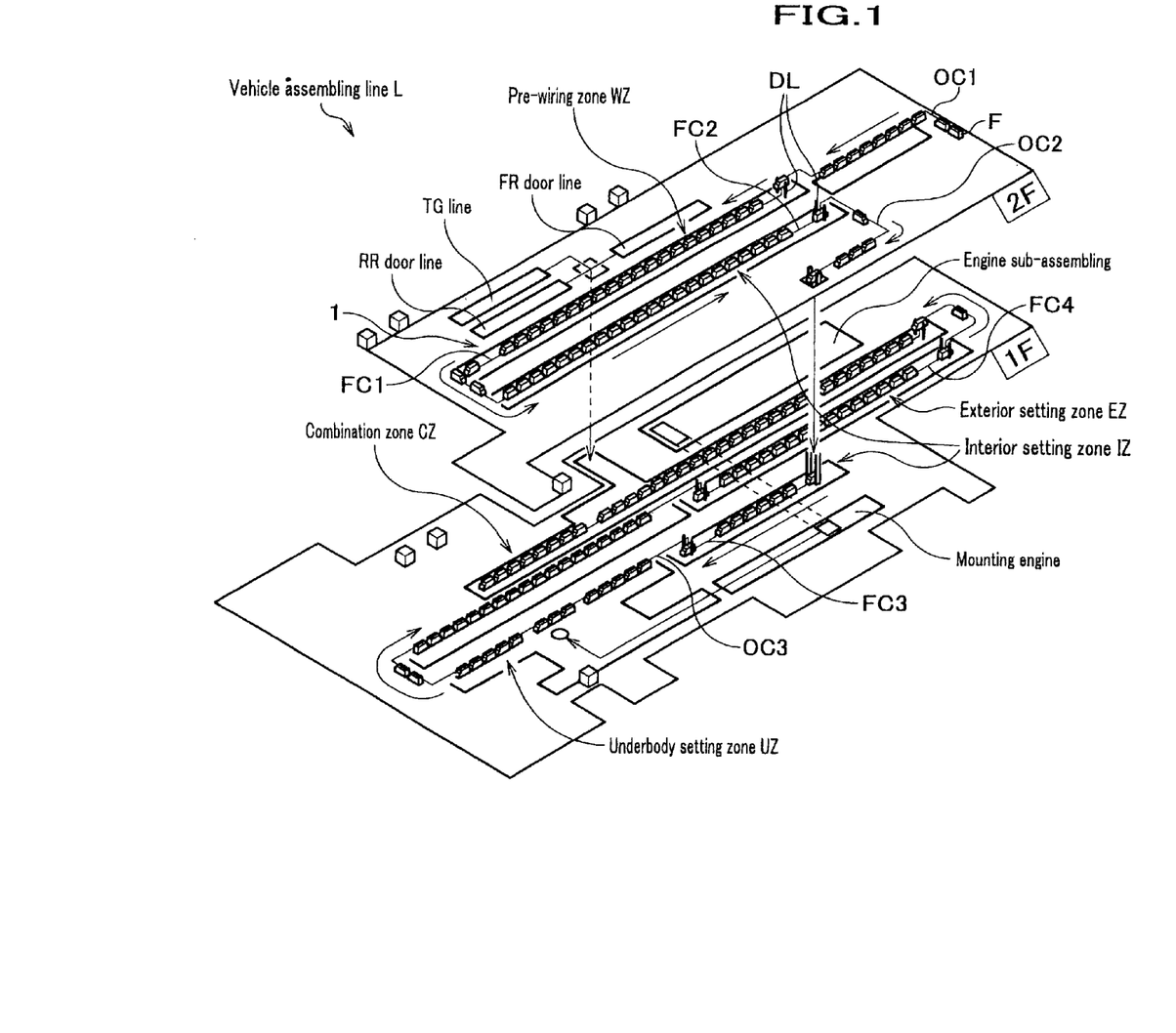
FIG. 1 is a whole structural view of a vehicle assembling line including an assembling line of the present embodiment.
Figure 2:
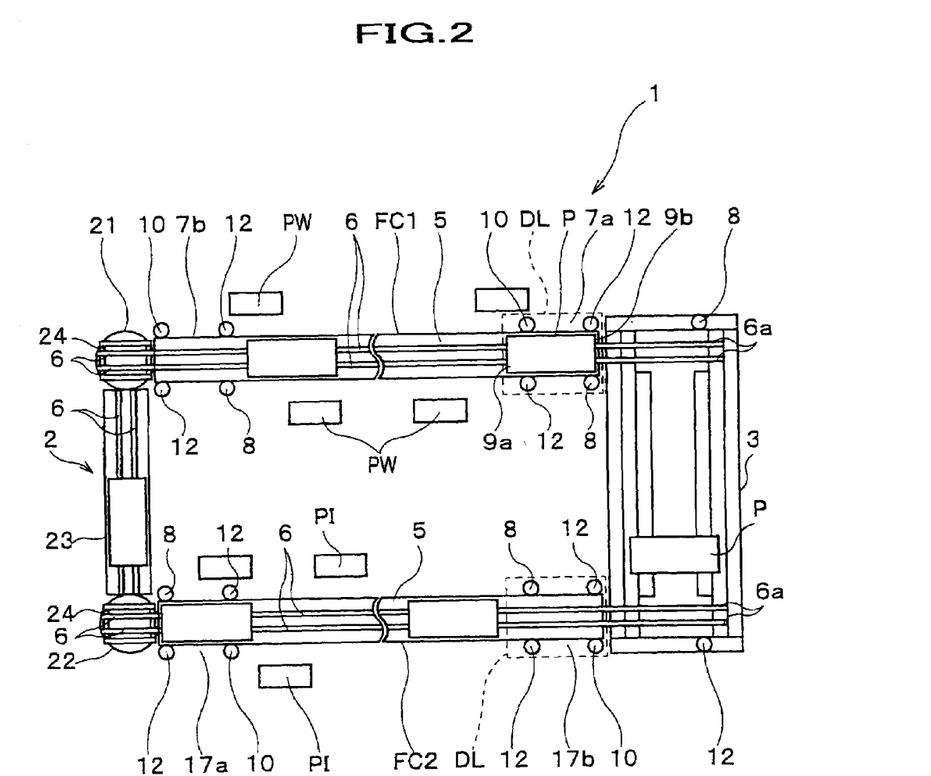
FIG. 2 is a schematical top view of an assembling line of the present embodiment.
Figure 3A:
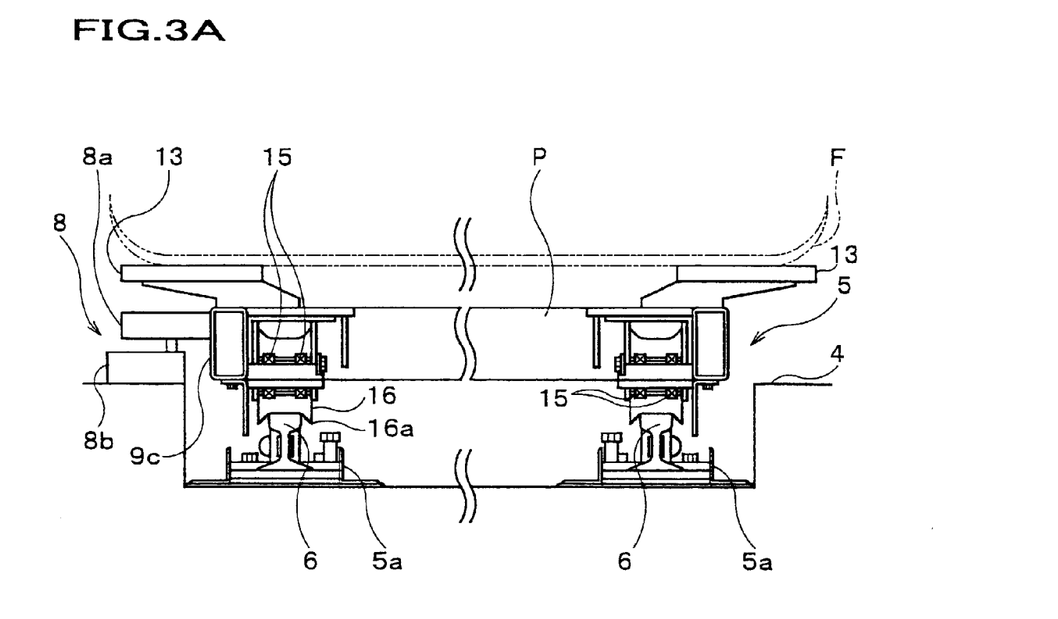
FIG. 3(a) is a cross sectional view of a friction conveyer.

FIG. 1 is a whole structural view of the vehicle assembling line including the assembling line of the embodiment, FIG. 2 is a schematical view of the assembling line of the present embodiment seen from top, FIG. 3(a) is a cross sectional view of a friction conveyer comprising the assembling line.

In the present embodiment, a lengthwise direction is a direction of the vehicle body length and a conveying direction of each conveyer. On the other hand, a lateral direction is the breadthwise direction of the vehicle body and a perpendicular direction to a conveying direction of each conveyer.

First of all, a whole structure of the vehicle assembling line L is described with reference to FIG. 1. The vehicle assembling line L is used to assemble the vehicle through conveying the vehicle body F in the direction of the arrow marks shown in FIG. 1. The vehicle assembling line L is classified as a main line, a sub-line, or a door assembling line depending on the region. The main line is comprised of a plurality of assembling zones for several kinds of parts attaching to a vehicle body F depending on attaching region (for example, interior, exterior and underbody, etc.), such as a wiring zone WZ for electric system, an interior zone IZ, a underbody zone UZ, an exterior zone EZ and a combination zone CZ. The sub-line is comprised of an engine sub-assembling. The door assembling line is comprised of FR door line and RR door line connected to the main line in case of necessary.

The wiring zone WZ is a zone wherein an electric wiring of the vehicle and LAN wiring, pipeline, etc for inside of the vehicle are attached. The vehicle body F is conveyed by an overhead conveyer OC1 on the upper portion thereon while the vehicle body F is conveyed by a friction conveyer FC1 on the lower portion thereon.

The interior zone IZ is a zone wherein interior parts and floor parts, etc. are attached to the vehicle body by transferring them with friction conveyors FC2 and FC3. Hereupon, an instrumental panel, a pedal, linings, etc., are attached to the vehicle body F. An overhead conveyer OC2 is provided in between the friction conveyer FC1 and the friction conveyer FC2 to transfer the vehicle body F from a second floor to a first floor.

The underbody zone UZ is a zone wherein parts for an underbody of the vehicle are attached. Parts for underbody, suspension, engine and tires, etc are attached to the vehicle body F being conveyed by an over head conveyer OC3.

The exterior zone EZ is a zone wherein exterior parts are attached to the vehicle body. A window glass, a seat and a bumper, etc are attached to the vehicle body F being conveyed by a friction conveyer FC4.

The combination zone FZ is a zone wherein a functional test is carried out for any kinds of parts and equipment attached on the each assembling zone on the upper portion. This functional test confirms operation of the lights and connecting terminals, etc.

Secondly, the assembling line 1 of the present embodiment is described.

The assembling line 1 shown in FIG. 2 is formed as one portion of the vehicle assembling line L shown in FIG. 1. The assembling line 1 is the flat loop-arrangement assembling line comprising the friction conveyer FC1 on the lower portion of the wiring zone WZ for an electric system, the friction conveyer FC2 on the upper portion of the interior zone IZ, and the first traverse line 2 and the second traverse line 3 connecting said friction conveyers FC1 and FC2.

In the present embodiment, the friction conveyer FC1 is indicated as the second claimed conveying line; similarly, the friction conveyer FC2 is indicated as the first conveying line, and the second traverse line 3 is indicated as the traverse line.

The friction conveyer FC1, as indicating in FIG. 2 and FIG. 3(a), has two rails 6 established in parallel by fixing means 5a on the bottom face of a slender pit 5 formed on a floor face 4 to transfer the pallet P along these rails 6. Hereupon, the pallet P is transferred by a driving portion 8 and a stopping portion 10 provided on a starting point 7a (right end in FIG. 2) and an end point 7b (left end in FIG. 2) of the friction conveyer FC1. In FIG. 2, the pallets P are positioned at intervals on the friction conveyer FC1. In operation, each pallet P is positioned such that a front face 9a is contacted with a rear face 9b of the other pallet P so that the rear pallet P pushes the front pallet P along the rail 6.

The driving portion 8 is comprised of a rotatable cylindrical-shaped drive roller 8a and a roller drive motor 8b to rotate the drive roller 8a. The drive roller 8a is provided such that the peripheral surface is contacted with a side surface 9c of the pallet P to push the pallet P by transmitting a torque generated in the driving roller 8a to the side face 9c of the pallet P through the roller drive motor 8b.

The stopping portion 10 causes a friction on the surface between the pallet P and the stopping portion 10 through rotating at a lower speed than that of the drive roller 8a to stop the pallet P. The constitution is the same as the driving portion 8.

In FIG. 2, 12 is a guide roller provided to stabilize the movement of the pallet P when driving or stopping. However, the guide roller 12 is not connected with a drive motor but is contacted with a side face 9c of the pallet P and only rotates in accordance with the movement of the pallet P.

Optionally, the driving portion 8 and the stopping portion 10 can be also constituted as movable to a stand-by position a predetermined distance away from the pallet P when not in use. In this case, when the pallet P is pushed out, the drive roller 8a moves from a stand-by position so as to contact the side face 9c of the pallet P. The drive roller 8a is returned to the original stand-by position again after the pallet P is pushed out. The stopping portion 10 stays in the stand-by position. Additionally, when stopping the pallet P, the drive portion 8 is waiting on the stand-by position and only the stopping portion 10 moves so as to contact with a side face 9c of the pallet P to stop the pallet P.

Figure 3B:
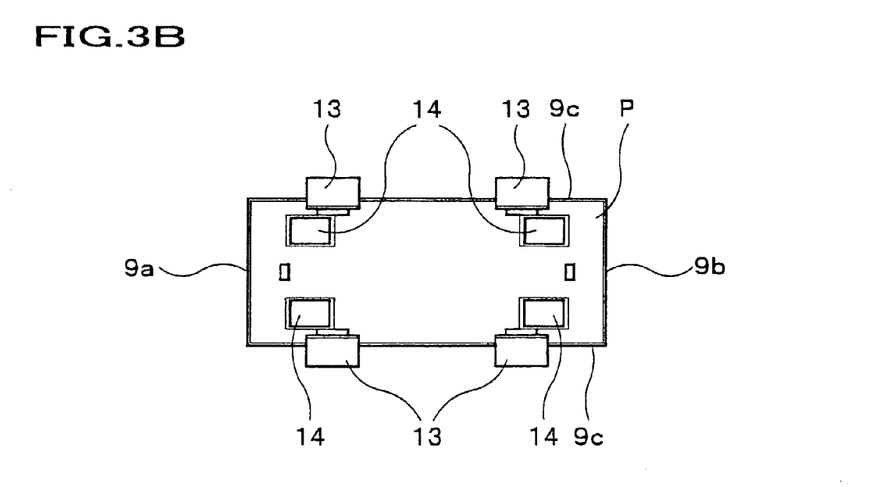
FIG. 3(b) is a top view of a pallet.

As indicated in FIGS. 3(a) and 3(b), the pallet P used for conveying the vehicle body F has a slender shape wherein four holding portions 13 are provided symmetrically in the lengthwise direction of the pallet P to support the vehicle body F. What is more, concave portions 14 are formed at an inner position in relation to the holding portion 13 on the pallet to avoid the protruded portion of the vehicle body F. This allows the height from the pallet P to the vehicle body F to be shortened. Consequently, attaching a wiring part PW to the vehicle body F can be easy.

Additionally, a plurality of positioning grooves (not shown) are formed in accordance with a type of vehicles (the length of vehicle body F) on the upper surface of the holding portion 13 to always maintain an invariable position for loading the vehicle body F. This is the constitution capable of responding to different types of vehicles.

Moreover, wheels 16 axially supported by a plurality of bearing 15 are located under the pallet P. When these wheels 16 are skidded on the rail 6 of the friction conveyer FC1, the pallet P can be moved along the rail 6. A flange 16a is provided on the wheel 16 to avoid derailing from the rail 6.

Furthermore, the friction conveyer FC2 is the conveying line to attach the interior parts PI such as an instrumental panel to inside of the vehicle body F. The structure is the same as that of the friction conveyer FC1.

Next, the first traverse line 2 and the second traverse line 3 are explained.

The first traverse line 2 moves the vehicle body F located on a pallet P from the end point 7b of the friction conveyer FC1 to the starting point 17a of the friction conveyer FC2. As shown in FIG. 2, the first traverse line 2 has a first turning table 21 and a second turning table 22 to turn the pallet P 90° around and a conveying line 23 between tables to move the pallet P from the first turning table 21 to the second turning table 22.

Figure 4A:
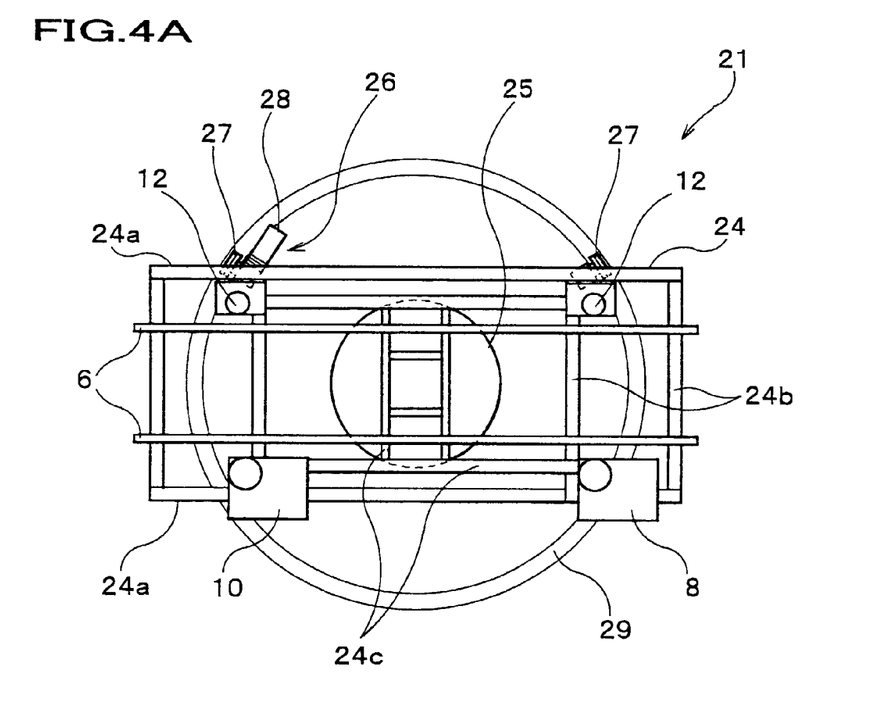
FIG. 4(a) is a top view of a first turning table.
Figure 4B:
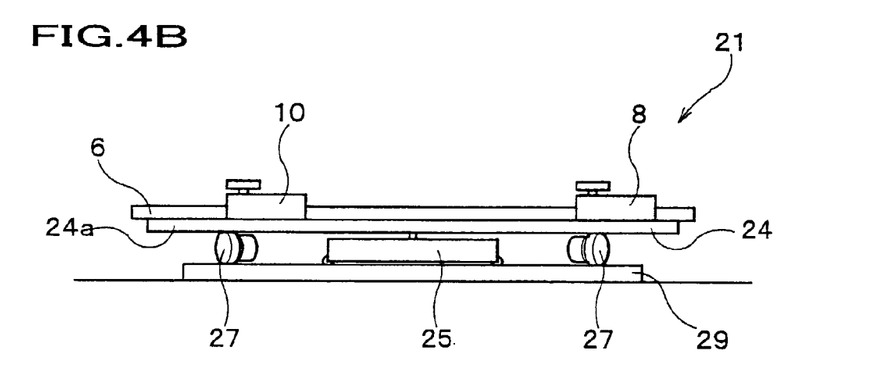
FIG. 4(b) is a side view of a first turning table.

The first turning table 21, as shown in FIGS. 4(a) and 4(b), has two rails 6, a frame body 24 to support the rails 6, a rotary center portion 25 positioned on the center of this frame body 24 and equipped with a rotary shaft, and a rotary driving means 26 provided under the frame body 24 to rotate the frame body 24 around a center of the rotary center portion 25.

The frame body 24 has side frames 24a provided parallel to the rail 6 and connecting frames 24b to connect the side frames 24a with each other. The stopping portion 10 to stop the pallet P entering the first turning table 21, the driving portion 8 to push the pallet P onto the conveying line 23 between the turning tables 21, 22 and the guide roller 12 are fixed on the frame body 24. 24c is an auxiliary frame body which fixes the driving portion 8 and the stopping portion 10 on the frame body 24. The frame body 24 and the rotary center portion 25 are connected with each other through this auxiliary frame body 24c.

The rotary driving means 26 is comprised of four wheels 27 provided under the surface of the frame body 24 and a wheel driving motor 28 which rotates the wheel 27. The rotary driving means 26 rotationally moves the wheel 27 along the annular guide ring 29 by driving the wheel driving motor 28 according to a signal from a controlling portion (not shown) to turn the first turning table 21 around toward a predetermined direction, preferably turning the pallet P by 90°.

Also, the second turning table 22 feeds the pallet P received from the conveying line 23 between tables to the friction conveyer FC2 after turning the pallet P, preferably by 90°. The second turning table 22 has the same structure as the first turning table 21.

The conveying line 23 between tables has two rails 6 and delivers the pallet P from the driving portion 8 of the first turning table 21 to the second turning table 22 in a constant orientation.

Figure 5A:
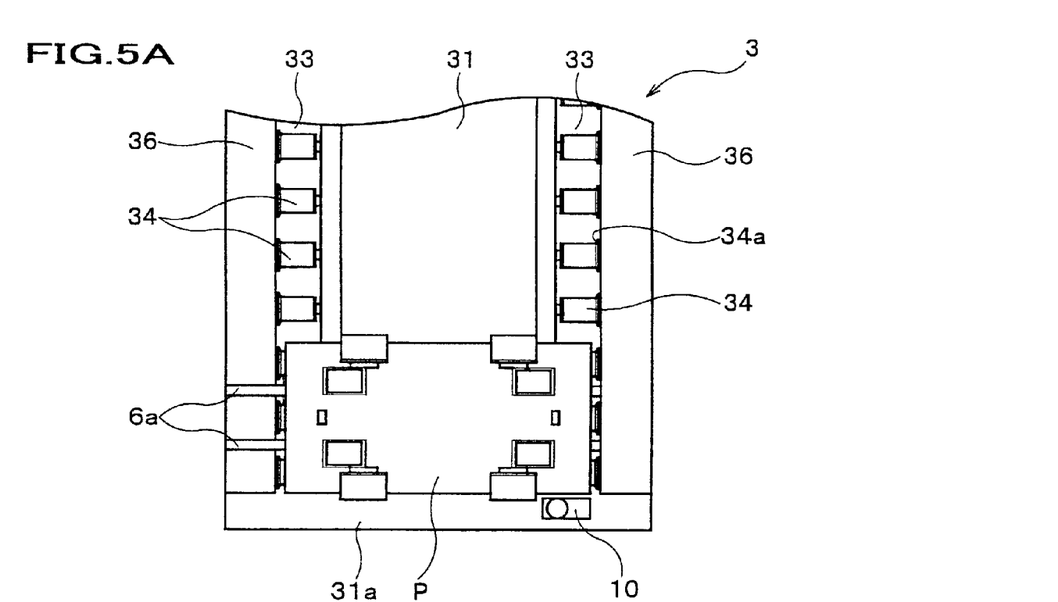
FIG. 5(a) is a partial enlarged view of a second traverse line.
Figure 5B:
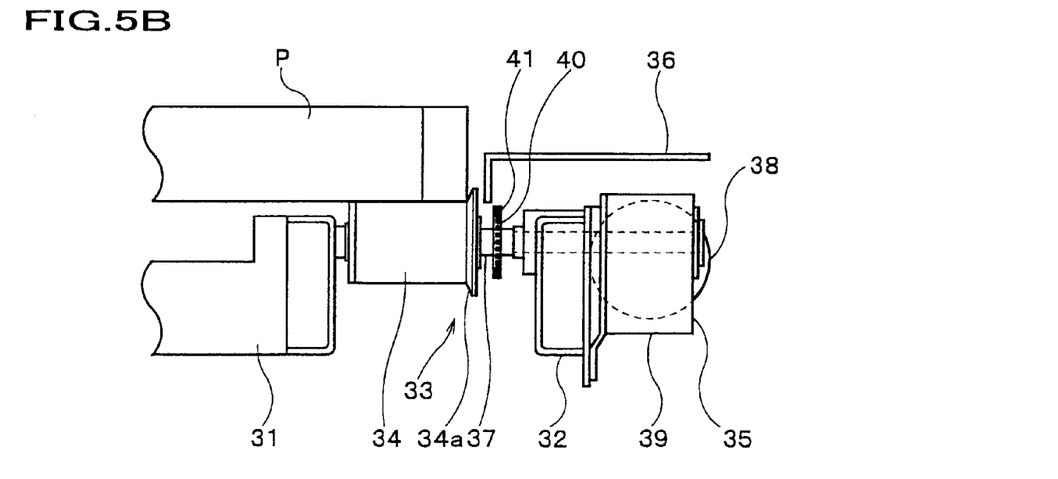
FIG. 5(b) is a side cross sectional view of FIG. 5(a).

The second traverse line 3 is described with reference to FIGS. 2, 5(a), and 5(b).

The second traverse line 3, as shown in FIG. 2, moves the pallet P from the end point 17b of the friction conveyer FC2 to the starting point 7a of the friction conveyer FC1 in a constant orientation without turning. As shown in FIGS. 5(a) and 5(b), the second traverse line 3 has a main frame 31 having a concave-shaped section to accommodate the wheels 16 of the pallet P, a side frame 32 provided on the side of the main frame 31 at regular intervals, a plurality of rollers 34 formed by the main frame 31 and the side frame 32 and arranged two abreast of grooves 33 perpendicular to the conveying direction of the pallet P on the friction conveyers FC1, FC2, and a driving mechanism 35 to drive the rollers 34. A cover 36 to protect the driving mechanism 35 is provided above the side frame 32.

Additionally, as shown in FIG. 2, a rail 6a to receive an empty pallet P from the friction conveyer FC2, or to feed an empty pallet P to the friction conveyer FC1, is established on each end of the second traverse line 3. This rail 6a is capable of moving up and down. When the pallet P is moved by the rollers 34, these rails 6a are moved downward, therefore, the pallet P can be moved in traverse direction along the rollers 34. Driving and stopping the pallet P are carried out by the driving portion 8 and the stopping portion 10 provided on the end frame 31a located at each end of the main frame 31.

The roller 34 has a rotary shaft 37. The rotary shaft 37 is axilly supported on the main frame 31 and the side frame 32 by a bearing (not shown), and a flange 34a or other guide means is provided on the peripheral portion of a sub frame side 32 of the rollers 34. This flange 34a is provided so as to be contacted with a front face 9a or a rear face 9b of the pallet P to prevent the pallet P from veering or jumping out of the second traverse line 3.

The drive mechanism 35 is comprised of a drive mechanism motor 38 associated with a plurality of rollers 34 arranged in a row, a rotary transmission box 39, such as a gear (not shown), to transmit the rotation of the drive mechanism motor 38 to the rotary shaft 37, a sprocket 40 provided in the rotary shaft 37 and a chain 41 wound around the sprocket 40. When the drive motor 38 is driven, the chain 41 is also driven, and the rollers 34 are rotated.

The roller 34 equipped with a flange 34a and the drive mechanism 35 comprise the claimed pallet conveying mechanism.

Next, the assembling work of the vehicle body F in the assembling line 1 is described.

Figure 6A:
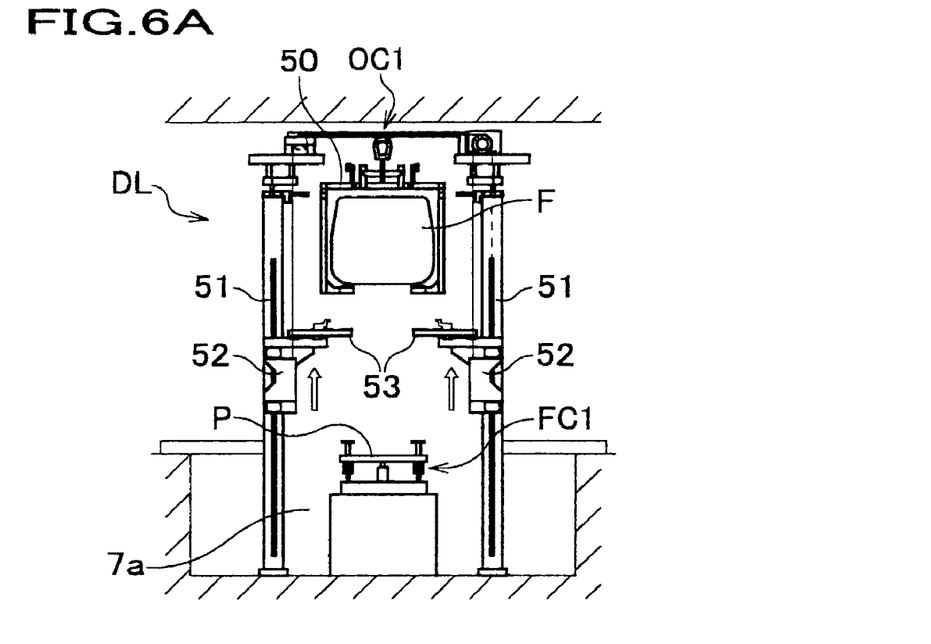
FIGS. 6(a) and 6(b) depict a movement of a drop lifter used in an assembling line.
Figure 6B:
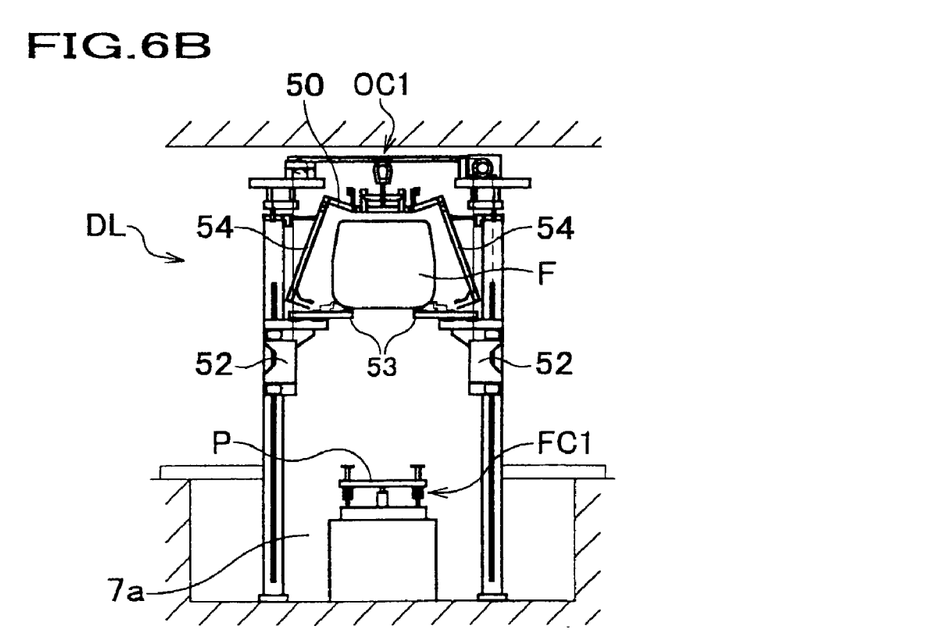
Figure 7A:
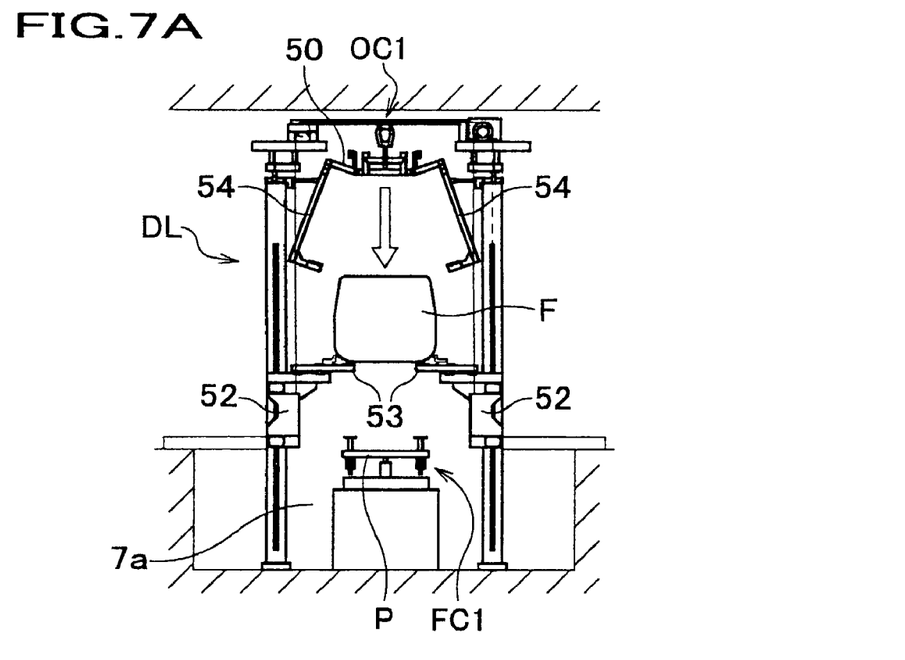
FIGS. 7(a) and 7(b) depict a movement of a drop lifter used in an assembling line.
Figure 7B:
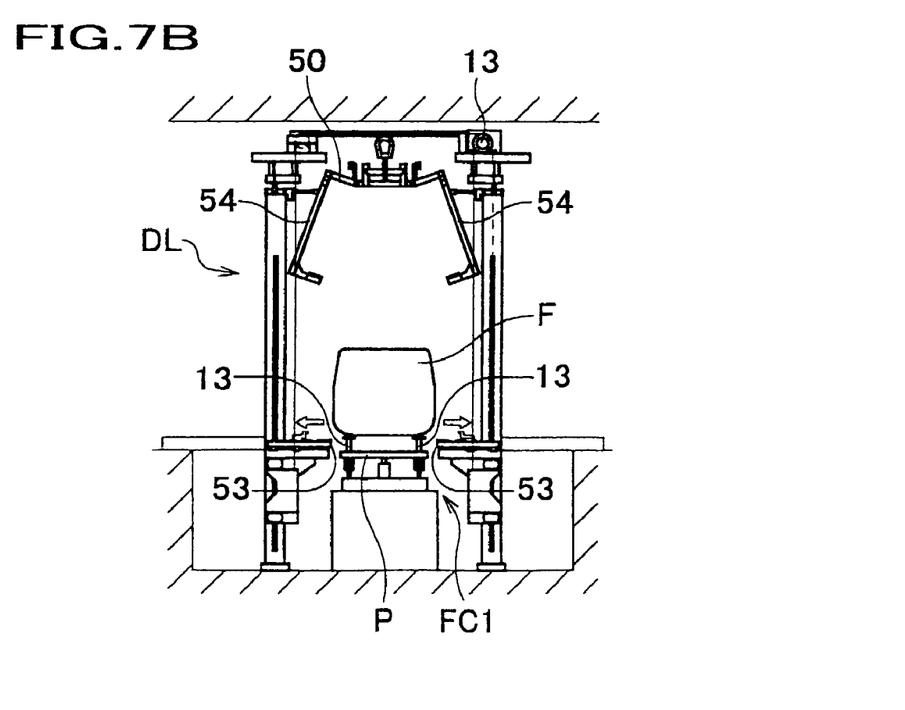

First of all, the vehicle body F conveyed by the over head conveyer OC1 shown in FIG. 1 is transferred and loaded onto the pallet P by the drop lifter DL. As shown in FIG. 2, the drop lifter DL is installed at the starting point 7a of the friction conveyer FC 1 and the end point 17b of the friction conveyer FC2 to have the arrangement shown in FIGS. 6 and 7. That is to say, when the vehicle body F arrives at the drop lifter DL (FIG. 6(a)), sliders 52 are risen along two posts 51 such that a holding portion 53 fixed on the slider 52 supports a side sill of the vehicle body F. Then, the arm opening and closing portions provided on the upper portion of the posts 51 open the arm portions 54 of the over head hanger 50 toward traverse direction (FIG. 6(b)), and the vehicle body F supported by only the holding portion 53 is transferred downward as shown in FIG. 7(a) to be transferred and loaded onto the pallet P waiting in the lower portion (FIG. 7(b)).

Thereafter the controlling portion (not shown) drives a drive roller 8a of a drive portion 8 to push out the pallet P from the starting point 7a to the end point 7b of the friction conveyer FC1 after confirming through a light sensor or other means that the vehicle body F is loaded onto the pallet P.

The worker may get into the pallet P or the vehicle body F to attach parts PW to inside of the vehicle before the pallet P arrives at the end point 7b of the friction conveyer FC1. The vehicle body F, which has completed the functional test of the attached parts PW, arrives at the end point 7b of the friction conveyer FC1 riding on the pallet P and is decelerated and stopped by the stooping portion 10 of the end point 7b.

Hereupon, the controlling portion drives the drive roller 8a of the drive portion 8 to push out the pallet P to the first turning table 21 after confirming the direction of the first turning table 21 of the first traverse line 2.

The pallet P introduced to the first turning table 21 is stopped on the rail 6 of the first turning table 21 by the stopping portion 10 fixed on the frame body 24. Then a wheel drive motor 28 rotates a wheel 27 to turn the pallet P by 90° around counter clockwise toward the conveying line 23 between turning tables.

After turning the pallet P is completed, the driving roller 8a of the driving portion 8 pushes out the pallet P to the conveying line 23 between turning tables and the pallet P arrives at the second turning table 22 via the conveying line 23 between turning tables. Hereinafter, the pallet P is pushed out to the friction conveyer FC2 after turning the pallet P by 90° around clockwise in much the same manner as the first turning table 21.

The pallet P is conveyed on the friction conveyer FC2 in much the same manner as on the friction conveyer FC1 and the worker attaches interior parts PI such as instrumental panels to the vehicle body F.

Then, the pallet P is stopped by the stopping portion 10 on the end point 17b of the friction conveyer FC2, where the vehicle body F is transferred and loaded onto the over head hanger 50 of the over head conveyer OC2 by the drop lifter DL.

After the vehicle body F is transferred and loaded onto the overhead hanger 50, the now empty pallet P is introduced to the second traverse line 3 by use of a drive roller 8a.

Once the empty pallet P is introduced to the second traverse line 3 and the flange portion 34a of the roller 34 is contacted with the front face 9a of the pallet P, a driving means 35 drives a chain 41 to rotate a plurality of rollers 34 arranged in two rows.

Rotating the rollers 34 allows the pallet P to be transferred on the second traverse line 3 in a traversal or lateral direction toward the friction conveyer FC1 from the friction conveyer FC2.

When the pallet P arrives at the end portion of the friction conveyer FC1 side of the second traverse line 3, the driving means 35 is stopped and the pallet P is pushed out to the starting point 7a of the friction conveyer FC1 by the drive portion 8.

Repeating the above cycle allows the pallet P to be transferred by circulating through the flat-loop arrangement assembling line 1. This assembling line 1 has a symmetrical configuration for a lengthwise conveying direction of the pallet P. Therefore, a following vehicle body F can be loaded on the pallet P without the pallet P being turned by the second traverse line 3. This allows the second traverse line 3 to have a simple structure without a turning mechanism. Additionally, a time period to convey the pallet P can be shortened because of not involving a turning movement.

What is more, since the pallet is turned by 180° around on the first traverse line 2, the front portion of the vehicle body F is always pointed toward the conveying direction of the friction conveyer FC1 and FC2; consequently, the worker can easily work and the working efficiency of assembling the vehicle body F can be improved. However, though the front and back of the pallet P are switched whenever the pallet P makes a trip all the way around the assembling line 1, there is no influence on loading the vehicle body F onto the pallet P and attaching the parts PW, PI to the vehicle body F because the pallet P has a symmetrical configuration in the lengthwise or longitudinal direction.

The present invention is not restricted to the described embodiment, but may be widely applied. For example, the first and second conveying line can be conveying lines equipped with a well-known conveying means such as a chain conveyer or a belt conveyer for conveying the pallet P instead of the friction conveyer FC1, FC2.

Furthermore, the assembling line 1 may include providing a lift to hoist and bring down the pallet P for delivering between the friction conveyers FC1, FC2 and the first traverse line 2 or the second traverse line 3 by providing the first traverse line 2 and the second traverse line 3 with a position higher or lower than a floor face 4 whereupon the friction conveyers FC1, FC2 are installed.

What is more, the pallet P can be turned 180° around on the first turning table 21 without installing the second turning table 22 on the first traverse line 2. The assembling line 1 can then be a simpler mechanism due to a reduction of a turning mechanism.

Additionally, the constitution of the first traverse line 2 may be the same as that of the second traverse line 3 and the vehicle body F loaded on the pallet P received from the friction conveyer FC1 may be delivered from the friction conveyer FC1 to the friction conveyer FC2 without turning.

Also, the guide means may be a roller provided so as to be contacted with a side face 9c of the pallet P instead of the flange 34a formed along the periphery of the roller 34.

INDUSTRIAL APPLICABILITY

The present invention includes a pallet conveying mechanism equipped with rollers having a flange to contact with the pallet. This conveying mechanism conveys the pallet from the second conveying line to the first conveying line without turning the pallet. Therefore, the flange can prevent the pallet from veering while the rollers allow the pallet to be moved in parallel. Consequently, the pallet can be rapidly conveyed through a simple conveying mechanism.

Additionally, since the assembling line is a loop arrangement using said pallet conveying mechanism, the simple conveying mechanism can circulate the pallet efficiently to assemble the vehicle body.

Moreover, since the turning table to turn the pallet is provided on both ends of the traverse line to convey the pallet from the first conveying line to the second conveying line, the direction of the vehicle body loaded onto the pallet can be constant in the conveying direction of both the first and second conveying lines. Consequently, the working efficiency of workers can be improved.

The invention claimed is:

1. A pallet conveying mechanism in a vehicle assembly line comprising a first conveying line and a second conveying line for placing parts on a plurality of pallets in a conveying direction and for conveying the parts, the plurality of pallets have a symmetrical form with respect to a front and a rear side of each of the pallets, a first axis comprises a pallet moving direction, the pallet conveying mechanism carries a vacant pallet along a direction perpendicular to the first axis from one of a plurality of drop lifters which transfers from one of the plurality of pallets parts provided at an end point of the first conveying line, and loading the parts on one of the plurality of pallets to one of the plurality of drop lifters for transferring the parts provided at an opposing starting point of the second conveying line to one of the plurality of pallets and loading the parts on the plurality of pallets, said pallet conveying mechanism comprising;
- a plurality of rollers arranged so as to move said vacant pallet perpendicularly to the first axis,
- a driving means for rotating said rollers, and
- a guide means provided on a peripheral portion of the rollers for preventing said vacant pallet from veering while said vacant pallet is being conveyed.

2. An assembling line comprising;
- a first conveying line,
- a second conveying line,
- a pallet conveying mechanism as set forth in claim 1 connecting the end point of said first conveying line and the starting point of said second conveying line, and
- a traverse line connecting the end point of said second conveying line and the starting point of said first conveying line,
- wherein, parts are attached to a vehicle body loaded onto said pallet while said pallet is circulated through the assembling line.

3. An assembling line as set forth in claim 2, wherein said traverse line has a turning table at both ends of the traverse line to turn said pallet 90° around and said traverse line moves said pallet in a direction substantially parallel to said first axis.

4. An assembling line as set forth in claim 2, wherein the first and second conveying lines are friction conveyors.

5. An assembling line as set forth in claim 4, further comprising a lift to hoist and bring down said pallet for delivering between the friction conveyors.

6. An assembling line as set forth in claim 2, wherein said pallet is conveyed along said first conveying line, and from the end point of said first conveying line to the starting point of said second conveying line, and along said second conveying line, without rotating.

7. The pallet conveying mechanism according to claim 1, further comprising a vehicle pallet conveying mechanism, wherein the pallet conveys a vehicle.

8. The assembling line as set forth in claim 2, further comprising a vehicle assembling line, wherein the vehicle assembling line assembles a vehicle by attaching parts to the vehicle while the vehicle is transferred by the pallet along the pallet conveying mechanism.

9. The pallet conveying mechanism according to claim 1, further comprising a stopping portion causing friction on a surface between the pallet and the stopping portion by rotating at a lower rotating speed than the driver means to stop the pallet.

10. The assembling line according to claim 2, wherein a front and a rear direction of the pallet is changed when the pallet is conveyed from the end point of the first conveying line to the starting point of the second conveying line.

11. A pallet conveying mechanism in a vehicle assembly line comprising:
- a first conveying line;
- a second conveying line;
- a plurality of drop lifters;
- a plurality of pallets having symmetrical front and rear sides, wherein the plurality of pallets are conveyed along the first and second conveying lines;
- a plurality of rollers;
- a driving means for rotating said rollers; and
- a guide means provided on a peripheral portion of the rollers,
- wherein a first axis comprises a pallet conveying direction,
- wherein a vacant pallet is conveyed in a transverse direction which is a direction perpendicular to the first axis,
- wherein one of the plurality of drop lifters transfers parts from one of the plurality of pallets provided at an end point of the first conveying line to a starting point of the second conveying line,
- wherein the plurality of rollers are arranged to move said vacant pallet perpendicularly to the first axis, and
- wherein the guide means prevents said vacant pallet from veering while said vacant pallet is being conveyed in the transverse direction.

* * * * *